(12) United States Patent
Banu et al.

(10) Patent No.: US 11,180,891 B2
(45) Date of Patent: *Nov. 23, 2021

(54) NATURAL FIBER REINFORCED COMPOSITE PANEL AND METHOD

(71) Applicant: The Regents of the University of Michigan, Ann Arbor, MI (US)

(72) Inventors: Mihaela Banu, Ann Arbor, MI (US); Shixin Jack Hu, Ann Arbor, MI (US); Tae Hyung Kim, Ann Arbor, MI (US); Song Ling Young, Ann Arbor, MI (US)

(73) Assignees: THE REGENTS OF THE UNIVERSITY OF MICHIGAN, Ann Arbor, MI (US); OPTIMAL, INC., Plymouth, MI (US)

(*) Notice: Subject to any disclaimer, the term of this patent is extended or adjusted under 35 U.S.C. 154(b) by 142 days.

This patent is subject to a terminal disclaimer.

(21) Appl. No.: 16/219,305

(22) Filed: Dec. 13, 2018

(65) Prior Publication Data

US 2019/0112764 A1 Apr. 18, 2019

Related U.S. Application Data

(63) Continuation of application No. 14/455,884, filed on Aug. 9, 2014, now Pat. No. 10,184,215.
(Continued)

(51) Int. Cl.
*D21C 1/06* (2006.01)
*D21H 23/24* (2006.01)
(Continued)

(52) U.S. Cl.
CPC ............... *D21H 23/24* (2013.01); *B27N 3/12* (2013.01); *D21C 1/02* (2013.01); *D21C 3/02* (2013.01); *D21C 3/04* (2013.01); *D21C 5/00* (2013.01)

(58) Field of Classification Search
CPC . D21H 23/24; D21C 3/02; D21C 3/04; D21C 1/02; D21C 5/00
(Continued)

(56) References Cited

U.S. PATENT DOCUMENTS 5,393,214 A 2/1995 Irie et al.
5,415,821 A 5/1995 Irie et al.
(Continued)

FOREIGN PATENT DOCUMENTS

CN 101824751 A 9/2010
CN 102517667 A 6/2012
(Continued)

OTHER PUBLICATIONS

Gassan et al., "Possibilities for improving the mechanical properties of jute/epoxy composites by alkali treatment of fibers", Composites Science and Technology 59 (1999), pp. 1303-1309.
(Continued)

*Primary Examiner* — Jacob T Minskey
(74) *Attorney, Agent, or Firm* — Reising Ethington P.C.

(57) ABSTRACT

A method of making a natural fiber composite panel includes extracting bamboo fibers from bamboo and embedding the extracted bamboo fibers in a polymer matrix material. The bamboo includes bamboo fibers and lignin, and the step of extracting includes mechanically scraping the bamboo fibers to remove at least some of the lignin. In some cases, the bamboo is steamed, soaked in water, soaked in an acidic solution and/or soaked in an alkaline solution before mechanical scraping.

12 Claims, 3 Drawing Sheets

Related U.S. Application Data

(60) Provisional application No. 61/864,211, filed on Aug. 9, 2013.

(51) Int. Cl.
| | | |
|---|---|---|
| *D21C 1/02* | (2006.01) | |
| *D21C 5/00* | (2006.01) | |
| *B27N 3/12* | (2006.01) | |
| *D21C 3/02* | (2006.01) | |
| *D21C 3/04* | (2006.01) | |

(58) Field of Classification Search
USPC .......................................................... 162/13
See application file for complete search history.

(56) References Cited

U.S. PATENT DOCUMENTS

| | | | |
|---|---|---|---|
| 5,667,886 | A | 9/1997 | Gough et al. |
| 5,786,063 | A | 7/1998 | Shibusawa et al. |
| 5,804,007 | A | 9/1998 | Asano |
| 5,814,170 | A | 9/1998 | Shibusawa et al. |
| 5,882,745 | A | 3/1999 | Mi et al. |
| 5,972,467 | A | 10/1999 | Washo |
| 6,004,493 | A | 12/1999 | Hussong |
| 6,086,804 | A | 7/2000 | Akiyama et al. |
| 6,638,612 | B2 | 10/2003 | Jones |
| 6,689,298 | B2 | 2/2004 | Yoshida |
| 7,431,980 | B2 | 10/2008 | Woodman et al. |
| 7,981,233 | B2 | 7/2011 | Wellwood et al. |
| 8,333,858 | B2 | 12/2012 | Rubin et al. |
| 2002/0192401 | A1 | 12/2002 | Matsumoto et al. |
| 2004/0043168 | A1 | 3/2004 | Ishikawa et al. |
| 2008/0220237 | A1 | 9/2008 | Korger |
| 2009/0130377 | A1 | 5/2009 | Samanta et al. |
| 2009/0263617 | A1* | 10/2009 | Ou .......................... B32B 21/12 428/106 |
| 2011/0258956 | A1 | 10/2011 | Felton |
| 2011/0281076 | A1 | 11/2011 | Anderson et al. |
| 2012/0070609 | A1 | 3/2012 | Poppe et al. |

FOREIGN PATENT DOCUMENTS

| | | |
|---|---|---|
| CN | 102896843 A | 1/2013 |
| CN | 103144153 A | 6/2013 |

OTHER PUBLICATIONS

Okubo et al., "Development of bamboo-based polymer composites and their mechanical properties", Composites: Part A 35 (2004), pp. 377-383.

Nur et al., "Preparation of Polymer Composites using Natural Fiber and their Physico-Mechanical Properties", Bangladesh J. Sci. Ind. Res. 45(2), (2010), pp. 117-122.

Takahashi et al., "Bamboo fiber reinforced thermoplastic molding made of steamed wood flour", J Mater Sci (2011), pp. 6841-6849.

Phong et al., "Study on How to Effectively Extract Bamboo Fibers from Raw Bamboo and Wastewater Treatment", Journal of Materials Science Research, vol. 1, No. 1, Jan. 2012, pp. 144-155.

Chinese Office Action in Chinese with English summary for CN application No. 201480051476.6, dated Jun. 28, 2017, 12 pages.

Chinese Office Action in Chinese with English summary for CN application No. 201480051476.6, dated Dec. 7, 2017, 7 pages.

Deng et al., "Design and Development of Furniture," Chemical Industry Press, Jan. 2010, pp. 14-18.

International Search Report for application No. PCT/US2014/050454, dated Nov. 26, 2014, 3 pages.

Written Opinion for application No. PCT/US2014/050454, dated Nov. 26, 2014, 6 pages.

\* cited by examiner

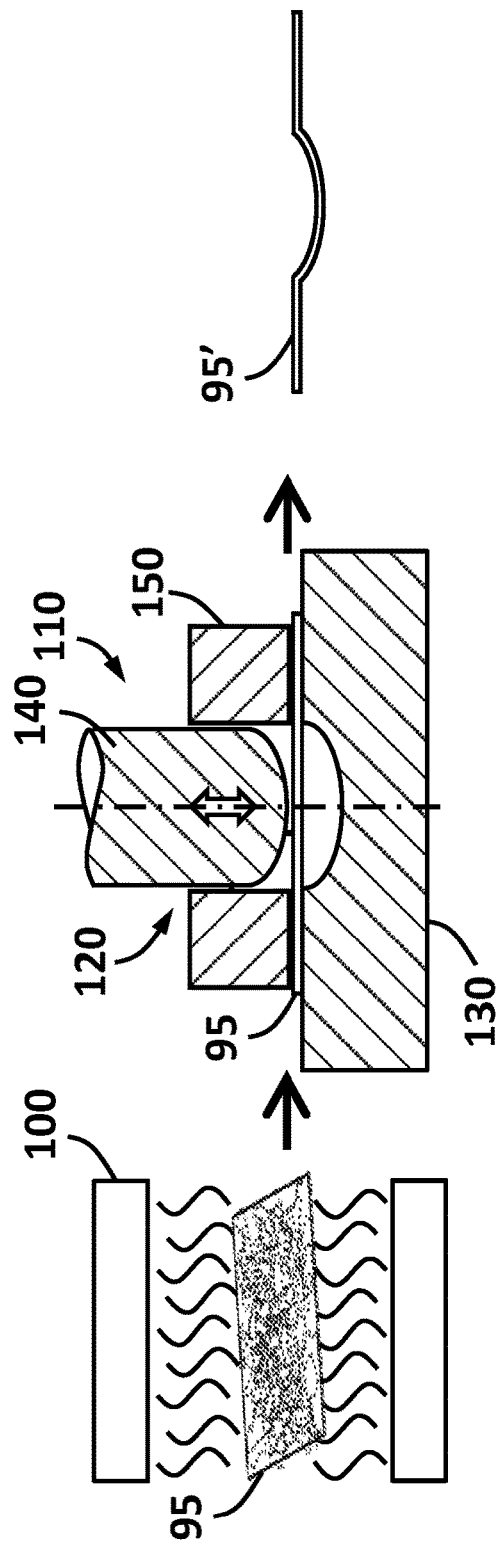
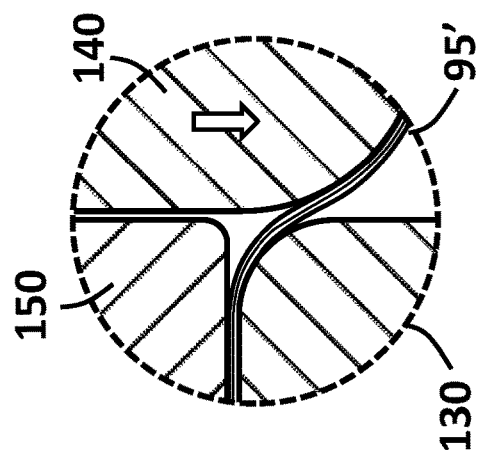
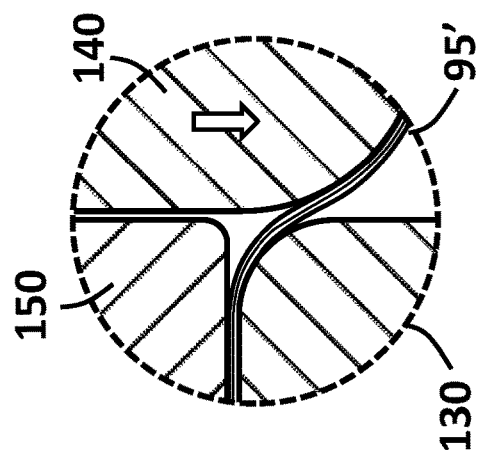
FIG. 3
FIG. 4
FIG. 5

NATURAL FIBER REINFORCED COMPOSITE PANEL AND METHOD

TECHNICAL FIELD

The present disclosure relates generally to reinforced composite sheet materials and, more particularly, to natural fiber reinforced composite sheet materials.

BACKGROUND

While natural fiber fillers for use in polymeric materials have attracted some interest as potential replacements for more traditional reinforcing materials, such as fiberglass, commercialization of such products has been limited. Extracting natural fibers from renewable plant sources in a sufficiently purified form has been a challenge, as has identifying natural fibers with mechanical properties comparable to man-made reinforcing materials. Known sheet materials formed from polymeric material commonly involve mixing chopped natural fibers such as wood with a polymeric material with the two constituents being molded into an intermediate or final product.

SUMMARY

The reinforced composite panel described herein, and the methods for making it, addresses the above-noted and other issues with natural fiber composites in a manner that is scalable for cost-effective commercialization.

In accordance with an embodiment, a method of making a natural fiber composite panel includes the steps of extracting bamboo fibers from bamboo and embedding the extracted bamboo fibers in a polymer matrix material. The bamboo includes bamboo fibers and lignin, and the step of extracting bamboo fibers includes mechanically scraping the bamboo fibers to remove at least some of the lignin.

In some embodiments, the method includes steaming the bamboo before mechanically scraping the bamboo fibers.

In some embodiments, the method includes removing of non-fibrous cellulosic material during the step of mechanically scraping.

In some embodiments, the method includes treating the bamboo before mechanically scraping the bamboo fibers. The step of treating includes soaking the bamboo in liquid water, steaming the bamboo, soaking the bamboo in an acidic solution, soaking the bamboo in an alkaline solution, or any combination thereof.

In some embodiments, the bamboo fibers embedded in the polymer matrix material include bamboo fibers having a length that is the same as a length before the step of treating.

In some embodiments, after lignin removal, the bamboo fibers include bamboo fibers having a length that is the same as a length before lignin removal.

In some embodiments, the bamboo fibers embedded in the polymer matrix material have an average length at least 50 times a thickness of the panel.

In some embodiments, a ratio of bamboo fiber length to panel thickness is in a range from 50 to 100.

In some embodiments, the method includes combining the bamboo fibers with the polymeric matrix material in pellet form, and bamboo fiber length is at least one order of magnitude greater than a length of the pellets.

In some embodiments, the bamboo fibers are wet during the step of mechanical scraping.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the appended drawings, wherein:

FIG. 3 is a schematic illustration of exemplary steps for further shaping the reinforced composite panel using a forming tool;

FIG. 4 is an enlarged view taken from FIG. 3; and

FIG. 5 is the enlarged view of FIG. 4, showing the composite panel being shaped by the forming tool.

DESCRIPTION OF THE ILLUSTRATED EMBODIMENTS

An exemplary method of making a reinforced composite panel may include the steps of: treating a plant source comprising natural fibers with a solvent and processing the treated plant source. The processing step can include arranging the natural fibers into a sheet-like orientation in a variety of ways. A polymeric material is then applied to the natural fibers to form a composite sheet, and the composite panel can be formed from one or more composite sheets. Some examples of this method are described with reference to FIGS. 1 and 2.

Figure 1:
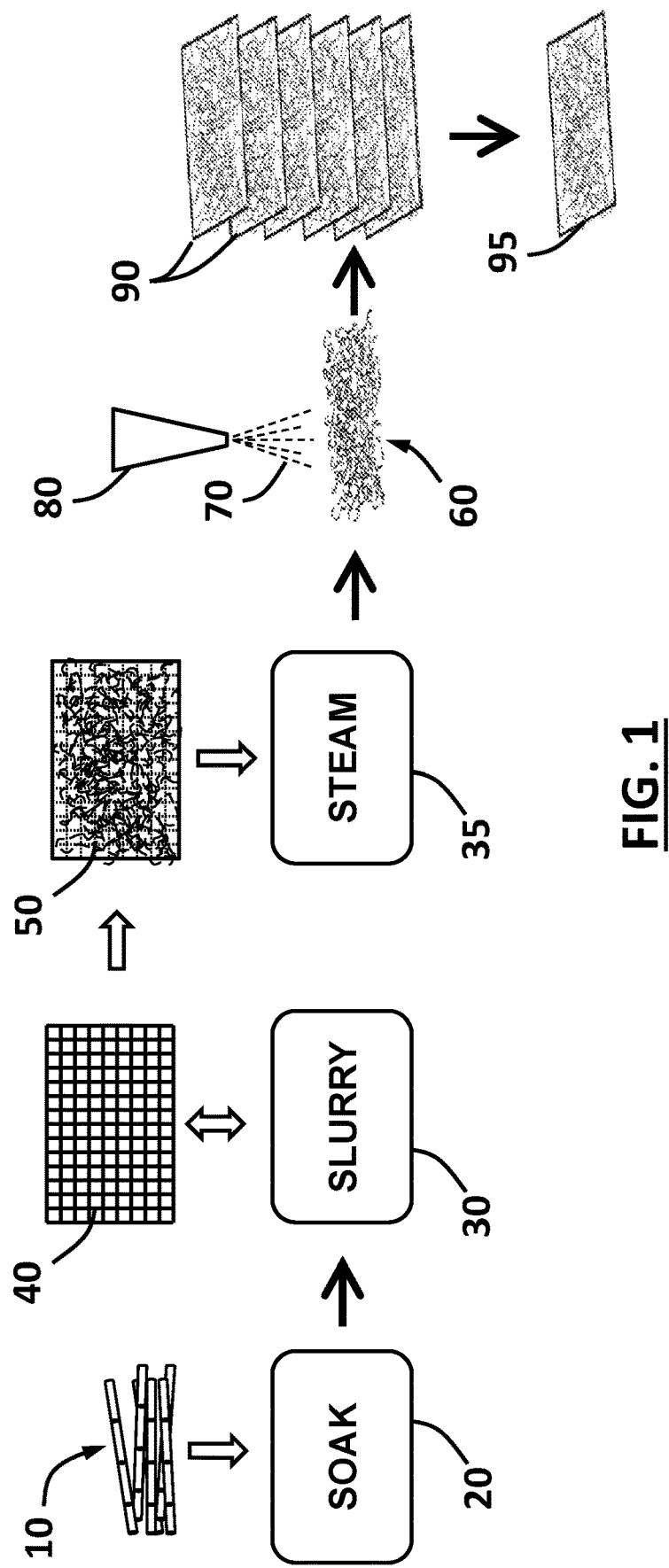
FIG. 1 is a schematic illustration of exemplary steps of a method of making a reinforced composite panel.

In the example of FIG. 1, the plant source 10 is bamboo sheaths and the solvent is water. The treatment includes exposing the bamboo sheaths to the water in vapor form (i.e., steam) and in liquid form. In this example, the bamboo is first soaked in the solvent in a soaking tank 20 to form a slurry 30 comprising the solvent and fibers from the plant source. The soaking process may itself include soaking the plant source in more than one solution that includes the solvent. In one embodiment, the soaking process includes soaking the plant source in an aqueous alkaline solution, such as a sodium hydroxide solution, as well as soaking the plant source in an acidic solution, such as hydrochloric acid. A rinsing step may be included between the soaking steps. In one particular example, bamboo sheaths are first soaked in a NaOH solution, rinsed with water, then soaked in an HCl solution to form the slurry. In the illustrated example, the slurry 30 is placed in a steamer 35 and steamed at a high temperature and pressure. In some embodiments, the pressure in the steamer 35 is about 30 psi, the temperature in the steamer is about 180° C., and the exposure time is about 1 hour. These parameters may vary depending on, for example, the type of plant source and natural fiber.

After exposure to the solvent in liquid and vapor form, the fibers are processed into sheet form by drying. In the illustrated example, a wire mesh 40 is used to collect some of the slurry 30 prior to the steam treatment. While still wet, the fibers in slurry form adhere to the mesh 40 in a relatively uniform layer and thereby take on a sheet-like orientation on the mesh. For example, the mesh 40 may be dipped into the slurry to collect the solid fiber material while allowing excess water to drain away. Alternatively, the slurry may be poured or otherwise spread onto the mesh or some other surface for steaming and/or drying, by using a spreading tool for example. The slurry-coated mesh 50 is subjected to drying conditions so that the water or other solvent can evaporate. The drying process may include placing the slurry-coated mesh 50 in a furnace or autoclave at a time and temperature sufficient to remove any remaining solvent from the slurry, leaving behind the desired natural fibers. Once the liquid has been driven off, a thin sheet or mat 60 of the processed natural fibers can be peeled or otherwise separated from the mesh. Alternatively, the liquid of the slurry may be only partially removed when the sheet of fibers 60 is removed from the mesh for further drying.

The sheet of natural fibers 60 may then be embedded within or otherwise bound together using a polymeric material 70, such as a liquid resin, to thereby form a completed composite sheet 90. In the illustrated example, a sprayer 80 coats the sheet of fibers 60 with the polymeric resin 70. The polymeric resin 70 may be in liquid form, such as a solvent-borne resin (e.g., epoxy), or in powder form during the coating process. In one embodiment, the polymeric resin is thermoplastic and is sprayed on in liquid form to penetrate and impregnate the mat of processed natural fibers 60 as a thermoplastic matrix material. Examples of suitable thermoplastic matrix materials include low-density polyethylene or a polyaryletherketone or polyketone, such as polyetheretherketone (PEEK). The polymeric resin 70 is allowed to harden to arrive at the composite sheet 90.

In one embodiment, PEEK is applied onto the sheet of dried or otherwise processed fibers 60 at about the melting temperature of the polymer and allowed to harden at room temperature for few minutes. The hardening process may be referred to as a curing process, and the completed sheets 90 of natural fibers may be referred to as pre-preg sheets. It is also possible, depending on the nature of subsequent processes, that the fiber mat 60 be bound with and/or embedded within a curable or unsaturated thermosetting resin and allowed to only partially cure before moving on to additional sheet forming processes. A plurality of composite sheets 90 is shown in FIG. 1 ready for further processing or use. A natural fiber composite panel 95 may be one of the composite sheets alone, or it may comprise a plurality of composite sheets hot pressed or otherwise secured together.

Figure 2:
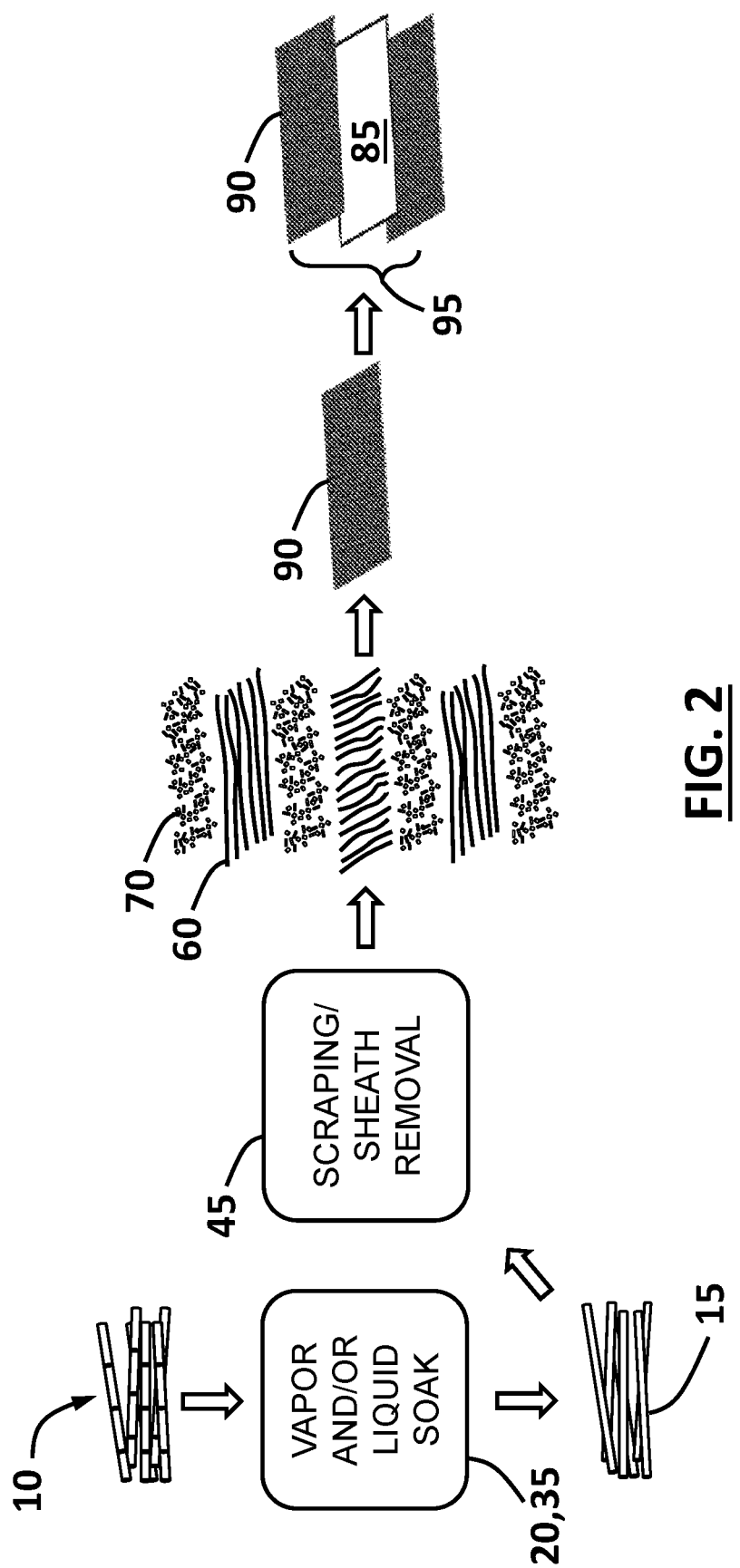
FIG. 2 is a schematic illustration of the steps of another method for making a composite panel.

FIG. 2 illustrates another example of the method, including processing the natural fibers and applying a polymeric material 70 to the processed fibers to form composite sheets 90 and panels 95. As in the example of FIG. 1, the plant source 10 is treated with a liquid and/or a vapor comprising a solvent, such as water in a soaking tank 20 and water vapor in a steamer 35. Soaking in the solvent and exposing it to the vapor can be done in either order when both are employed, and the liquid and/or vapor may include other constituents such as those described in conjunction with FIG. 1. In this case, where the plant source 10 is bamboo, the treated plant source 15 includes bamboo fiber strips.

In this example, processing the treated plant source 15 includes mechanical processing 45, such as a scraping. For bamboo, this mechanical processing of the treated material can be used to remove any outer sheath as well as at least some of the lignin and/or non-fibrous cellulosic portion of the treated bamboo. This exposes the desired natural fibers, which can then be dried for subsequent arrangement into sheet-like orientation for polymer application. For bamboo, and with certain other desirable fiber sources, the fibers have diameters on the micron scale, in a range between 75 and 100 microns, for example.

Forming of a completed composite sheet 90 in this example then involves aligning the processed fibers or groups of fibers into a sheet-like orientation and then combining the sheet of fibers with flowable polymeric material 70 in a flat mold or press. The fibers or groups of fibers can be arranged as one or more layers 60, and this can be done either using a single orientation (direction) for the fibers or groups of fibers, or using different orientations for the fibers or for groups of fibers. The flowable polymeric material 70 can be in liquid form as in the first example, or as shown in FIG. 2, can be in pellet form that can be poured, dumped, spread, or otherwise placed into the mold along with the fibers. Heat and pressure is applied during the molding operation to melt the pellets 70 and achieve a desired thickness, and the combined material is cooled to form a completed composite sheet or pre-preg sheet 90. In an embodiment, the minimum thickness of one pre-preg sheet is about 1 mm. In some embodiments, the polymeric material is LDPE, which has a melting temperature of about 250° C. In the same way, an unreinforced polymeric sheet 85 that contains no natural fibers, or is at least substantially free of natural fibers, may be prepared using the same mold. In other examples, each composite sheet 90 may be formed to include unidirectional fibers 60, which may or may not be subsequently layered with other composite sheets having fibers oriented in other directions to form a completed panel 95.

One or more composite sheets 90 can then be layered together and hot-pressed to form the natural fiber composite panel 95, in some cases using the same mold used to form the individual sheets 90. Each individual sheet 90 may already include fibers oriented in multiple directions, or unidirectional fiber sheets can be arranged with the fibers in different directions in this step. In the illustrated example, an additional unreinforced polymeric sheet 85, which may include the same thermoplastic or polymeric material used to form the sheet(s) 90, is interposed between composite sheets 90 to be heated and pressed. Unreinforced sheets 85 can be layered in alternating fashion with the composite sheets 90, or the unreinforced sheets can be arranged in any other layered combination with the composite sheets. Unreinforced sheets of the same polymer used to form the composite sheets 90 have demonstrated superior inter-layer adhesion among the layered composite sheets, helping prevent delamination in subsequent forming or shaping processes and in the final intended application.

FIG. 3 illustrates an exemplary process for further forming or shaping the composite panel 95. One or more composite panel 95 may be supported with heaters 100 arranged along opposite sides of the panel layers. The number of layers can be used to define the thickness of panel to be shaped. The heaters 100 may be infrared heaters or any other suitable heater. The heaters 100 soften the polymeric resin of the composite panel in preparation for a shaping process. In one example, the polymeric resin is PEEK, and the composite panels are heated at about 50° C. for about 2 minutes. Of course, heating temperatures and times may vary based at least on the type of resin included in the composite panel(s).

The heated panel 95 is then placed in a panel forming tool 110 to be shaped. The illustrated forming tool 110 includes a first or upper half 120 and a second or lower half 130. In this example, the upper half 120 is the moveable half and includes a punch 140 and a blank holder 150. The lower half 130 is the stationary half or die half. The composite panel 95 is placed over the forming die 130 with the forming tool in an open position as shown. The upper half 120 of the tool moves toward the die half 130, and the panel 95 is clamped between the blank holder 150 and the die half 130 at the perimeter of the panel. The punch 140 continues to move toward the die 130, and the heated panel 95 is shaped to conform to the tool surfaces it contacts. In order to maintain the elevated temperature of the heated panel 95, one or both of the die halves 120, 130 may also be heated. Where the polymeric resin is PEEK pre-heated at about 50° C., as in the example above, the tool halves 120, 130 may also be heated so that at least the forming surfaces are at about 50° C. The elevated temperature of the panel 95 and the tool surfaces facilitates deformation of the polymeric matrix of the panel and allows the natural fibers to flow and reorient relative to the matrix. In some cases, such as with panels formed with generally randomly oriented fibers, the strength of the shaped panel 95' may be increased compared to the panel when initially placed in the tool 110 due to the fibers being reoriented and more aligned with one another by the shaping process.

The blank holder 150 can be used to help control the flow of the composite panel 95 during forming to prevent wrinkles or cracks from forming during the process. Clamped tightly, the panel 95 may be primarily stretched without material from the panel flowing toward the shaped portion of the panel from the clamped portion. The clamp force may be lessened in some cases to allow material from between the blank holder 150 and the die half 130 to flow toward the shaped portion of the panel in a controlled fashion. The blank holder 150 is shown clamping the composite panel 95, 95' in the forming tool in the enlarged views of FIGS. 3 and 4. FIG. 3 shows the panel 95 before being shaped, and FIG. 4 shows the punch 140 in contact with the shaped panel 95'.

The illustrated process is compatible with traditional metal forming processes, making the natural fiber reinforced composite panel suitable for many applications, including interior and exterior automotive panels. The reinforced composite panel may also function as a vehicle panel in lightweight vehicle applications (e.g., aircraft or watercraft). The composite panel described here thus has many of the advantages of both metal and plastic panels, combining the weight savings, design freedom, and low tooling cost associated with traditional injection molded plastics with the high production rate of traditional sheet metal panels. Other possible applications include office or home furniture, construction materials (e.g., roofing flooring, fencing, railing, siding, acoustic paneling, etc.), home appliances, sports equipment, and wind turbines. The process can be carried out at much lower temperatures than those required for injection molding and with smaller tonnage forming presses that those required for metal forming.

In addition, the fibers in the composite panel may maintain their original length as introduced to the earlier-described fiber extraction process rather than being chopped to shorter and possibly less effective fibers as is normally used in reinforced plastic materials. The fiber processing and impregnation process described above is thus a relatively gentle process, maintaining the original integrity of the natural fibers to a large extent. For example, the thermal history of the natural fibers by the time they are part of a formed and reshaped composite panel is mild in comparison to the thermal history experienced by fibers in injection molding processes, where the fibers are subjected to molten plastic resin for extended periods of time—first during compounding and again during molding. The composite panels may be characterized by minimum fiber length with respect to panel thickness. In one example, the ratio of fiber length to panel thickness is in a range from about 50 to 100, or nearly two orders of magnitude. For instance, a panel of 3 mm in thickness may include natural fibers that are about 200 mm in length. Traditional compounding and pelletizing processes for combining fibers with polymeric materials limit fiber length to only a few millimeters, based on the maximum pellet dimension, thus severely limiting fiber length in any finished product or panel made from such materials. In an embodiment of the above-described process, such as that illustrated in FIG. 2, the fiber length may thus be characterized as having a length that is at least one order of magnitude greater than the pellet length, where the polymeric material is combined with the fibers in pellet form.

While presented here with bamboo as the source of the natural fibers and PEEK as the polymeric resin, these are only exemplary materials. Other natural fibers may be employed, such as hemp, flax, or other bast fibers. Bamboo is used here as an example due to its relatively high mechanical properties relative to other natural materials and compared to man-made fibers such as carbon fibers. For example, bamboo fibers have an elastic modulus of about 30 GPa in the lengthwise direction. A variety of polymeric materials may be used as the impregnating resin as well (e.g., an epoxy resin). Other process variations include non-aqueous extraction solvents, non-alkaline solutions during the boiling step, use of a non-wire mesh to collect the finer slurry for drying, polymer impregnation processes other than spraying (e.g., dip coating), and expedited drying and polymer resin hardening steps at elevated temperatures. Certain process steps may be omitted in some cases or repeated in others, and additional process steps not described here may be included. For example, the treatment step using the solvent may in some embodiments be carried out only by soaking, or only by steaming with the solvent, rather than by doing both. Or, the order of soaking and steaming could be reversed from what is shown in FIG. 1, for example.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method of making a natural fiber composite panel, the method comprising the steps of:
(a) extracting bamboo fibers from bamboo, wherein the bamboo includes bamboo fibers and lignin; and
(b) embedding the extracted bamboo fibers in a polymer matrix material, wherein step (a) includes mechanically scraping the bamboo fibers to remove at least some of the lignin.

2. The method of claim 1, further comprising the step of steaming the bamboo before mechanically scraping the bamboo fibers.

3. The method of claim 1, further comprising the step of removing non-fibrous cellulosic material during the step of mechanically scraping.

4. The method of claim 1, further comprising the step of treating the bamboo before mechanically scraping the bamboo fibers, wherein the step of treating includes soaking the bamboo in liquid water, steaming the bamboo, soaking the bamboo in an acidic solution, soaking the bamboo in an alkaline solution, or any combination thereof.

5. The method of claim 4, wherein the bamboo fibers embedded in the polymer matrix material in step (b) include bamboo fibers having a length that is the same as a length before the step of treating.

6. The method of claim 1, wherein after lignin removal, the bamboo fibers include bamboo fibers having a length that is the same as a length before lignin removal.

7. The method of claim 1, wherein the bamboo fibers embedded in the polymer matrix material in step (b) have an average length at least 50 times a thickness of the panel.

8. The method of claim 1, wherein a ratio of bamboo fiber length to panel thickness is in a range from 50 to 100.

9. The method of claim 1, wherein step (b) includes combining the bamboo fibers with the polymeric matrix material in pellet form, and bamboo fiber length is at least one order of magnitude greater than a length of the pellets.

10. The method of claim 1, wherein the bamboo fibers are wet during the step of mechanical scraping.

11. The method of claim 1, further comprising treating the bamboo to obtain bamboo fiber strips, wherein the step of mechanically scraping the bamboo fibers is performed on said strips.

12. The method of claim 11, wherein the step of treating includes treating the bamboo with a liquid and/or a vapor comprising a solvent before the step of mechanically scraping.

\* \* \* \* \*